United States Patent [19]

Sharp et al.

[11] 4,314,120
[45] Feb. 2, 1982

[54] SHOCK RESPONSIVE DEVICE

[76] Inventors: Mark B. Sharp, 19130 Sherman Way, Apt. 14, Reseda, Calif. 91335; Robert E. Sharp, 19732 Vanowen St., Canoga Park, Calif. 91306

[21] Appl. No.: 147,941

[22] Filed: May 8, 1980

[51] Int. Cl.³ .............................................. F16K 17/36
[52] U.S. Cl. ............................... 200/61.45 R; 137/45; 200/61.48; 200/61.5; 200/61.52
[58] Field of Search .......................... 73/652; 116/203; 137/38, 39, 45; 200/61.45 R, 61.48, 61.5, 61.52

[56] References Cited

U.S. PATENT DOCUMENTS

| | | | |
|---|---|---|---|
| 2,054,563 | 9/1936 | Hansen | 137/45 |
| 2,158,753 | 5/1939 | Hansen | 137/45 |
| 2,223,097 | 11/1940 | Ehret | 200/61.5 |
| 2,229,543 | 1/1941 | Bailey | 137/39 |
| 2,313,549 | 3/1943 | Hornain | 200/61.48 |
| 2,796,479 | 6/1957 | Walkup | 200/61.5 |
| 2,966,562 | 12/1960 | McElvain | 200/61.5 |
| 3,070,675 | 12/1962 | Domek | 200/61.45 R |
| 3,814,875 | 6/1974 | Takada | 200/61.48 |
| 3,898,400 | 8/1975 | Takada | 200/61.48 |
| 3,927,689 | 12/1975 | Sharp | 137/45 |

Primary Examiner—Robert G. Nilson
Attorney, Agent, or Firm—William P. Green

[57] ABSTRACT

A device adapted to respond to a mechanical shock as in an earthquake or the like, and including a first movable element to be controlled, a second element which normally blocks movement of the first element but is displaceable by shock-induced movement of a weight to permit movement of the first element, together with resetting mechanism operable to move the first element back toward its initial position and operable also to deflect the second element laterally back to an active position again blocking movement of the first element from its normal setting. The weight is preferably supported by a universal connection including a ball and socket joint in which the ball has an upper truncated portion defining a surface engageable with a movable part in a manner shifting that part axially in response to shock-induced pivotal movement of the weight structure.

11 Claims, 3 Drawing Figures 4,314,120

SHOCK RESPONSIVE DEVICE

BACKGROUND OF THE INVENTION

This invention relates to improved devices for automatically responding to mechanical shocks, as for instance shocks resulting from an earthquake.

In our prior U.S. Pat. No. 3,927,689 issued Dec. 23, 1975, we have disclosed a device adapted to respond to earthquakes or other shock forces, and including a weight displaceable by the shock to a position permitting axial movement of a controlled element. That element is desirably a valve, which in the form of the invention shown in the above identified patent is spring-urged upwardly toward a closed position and retained in a lower open position by the weight structure. The weight in that arrangement is suspended by a universal ball and socket connection, from which the weight depends in a manner normally assuming a position of alignment with the controlled element to hold it down.

SUMMARY OF THE INVENTION

The present invention provides certain improvements for shock responsive devices, and which may be applied to units of the above discussed general type shown in our prior patent. One feature of the invention relates to a unique resetting mechanism, which can be utilized, after shock-induced actuation of the device, to reset the unit to its original condition for response to a subsequent shock. This resetting mechanism acts both to retract one of two coacting elements in generally a predetermined direction, and to deflect one of the elements relative to the other transversely of that direction. The transverse or lateral deflection may be effected by a camming part, desirably taking the form of a generally funnel-shaped part which upon axial movement engages and deflects inwardly to a centered position one of the two mentioned coacting elements. The deflecting or camming part may be actuable by swinging movement of a lever, which is desirably pivotally connected to a second lever, with that second lever acting by swinging movement to move one of the two discussed coacting elements axially. The parts may be so interrelated that a single manual actuation will function to simultaneously exert force in one direction against one of those two elements and in an opposite direction against the deflecting part.

Additional features of the invention relate to provision of another controlled element which is actuated by the ball of the weight-supporting universal joint. More particularly, that ball may be truncated at its upper side to provide a surface which is generally planar and lies in a plane intersecting and truncating the top of the ball, with that surface engaging an axially movable element desirably projecting to an upper side of a top wall of the device and actuating an electric switch at that location.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENT

Figure 1:
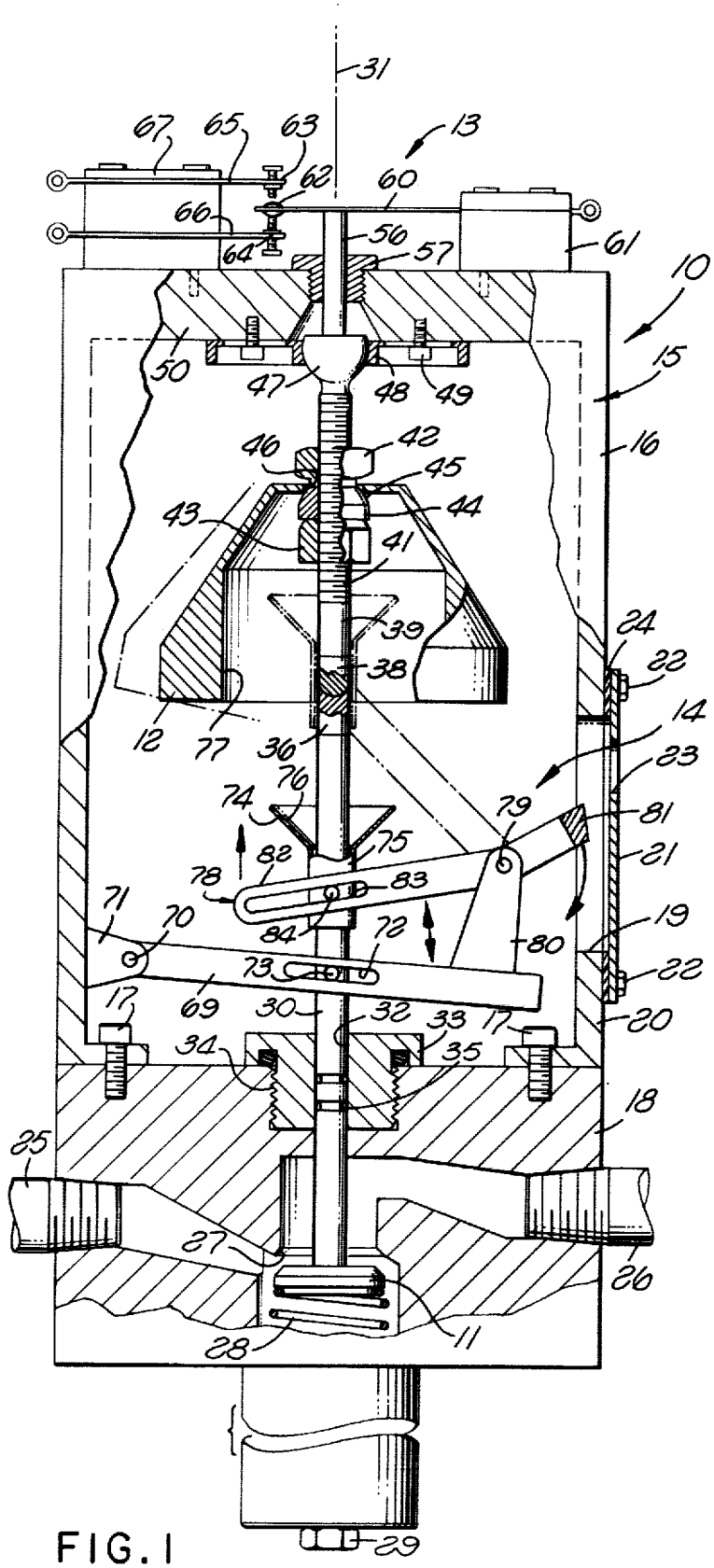
FIG. 1 is a central vertical section through a shock responsive valve and switch assembly constructed in accordance with the invention.

There is illustrated at 10 a shock responsive device similar in certain respects to the unit shown in our prior U.S. Pat. No. 3,927,689, and which may be employed as a safety device for automatically actuating a valve and-/or electrical switch when an earthquake shock or the like is encountered. The device is illustrated as including a valve 11 which closes upon shock-induced displacement of a control weight 12, and a switch assembly 13 also actuated by the weight. A resetting mechanism 14 constructed in accordance with the present invention acts to reset the entire unit after it has been actuated by an earthquake or other shock.

Most of the working parts of the device are contained within a housing 15 including an upper hollow section 16 secured by screws 17 to a base or bottom wall part 18. The resetting mechanism is accessible through a side opening 19 formed in a side wall 20 of upper housing part 16, with that opening normally being closed by a plate 21 secured by screws 22 and containing a viewing opening 23 through which a user can view the apparatus to determine whether it has been actuated. A gasket 24 may be provided between the periphery of plate 21 and side wall 20.

Valve 11 controls the flow of a fluid, such as natural gas, from an inlet 25 to an outlet 26, past an internal seat 27 in part 18. The valve is yieldingly urged upwardly toward seat 27 by a coil spring 28, whose tension may be adjustable by an adjusting part 29. An externally cylindrical stem 30 is rigidly secured to valve 11 and projects upwardly therefrom along the axis 31 of the valve, with the stem being received and guided within a passage or opening 32 in an element 33 screwed into the top of part 18 at 34. Seal rings 35 carried by stem 30 form a seal preventing escape of any of the fluid upwardly past that stem.

At its upper end, stem 30 carries a cap 36 containing a spherically curved concave recess 37 into which a cap 38 carried by another part 39 projects, with the cap 38 having a spherically curved convex surface 40 received within the recess formed by surface 37 and normally retained in alignment therewith. The element 39 is part of a depending movable weight assembly including the previously mentioned weight 12. Part 39 is essentially an elongated shaft aligned vertically with stem 30 of valve 11 and projecting upwardly therebeyond along and about the vertical central axis 31 of the device. The weight 12 is annular and desirably of the essentially bell-shaped configuration illustrated in FIG. 1, and is preferably free for limited universal movement relative to element 39 in accordance with the teachings of our prior U.S. Pat. No. 3,927,689. To permit such slight relative movement of the weight relative to element 39, the latter may have external threads 41 on which two vertically spaced nuts 42 and 43 are carried, with a part 44 clamped between the nuts and having an upper spherically curved annular surface 45 on which the weight 12 is supported. The top wall of the weight contains an opening 46 defining an annular edge engaging spherical surface 45. Thus, the weight 12 may move very slightly relative to part 39 before actually displacing that part 39, to thereby avoid response of the unit to minor shock forces. At its upper end, element 39 forms an externally spherical ball 47 retained by two or more complementary socket elements 48 secured by screws 49 to the top wall 50 of housing part 16. The socket elements 48 have complementary inner spherically curved surfaces 51 engaging and curving in correspondence with the outer spherically curved surface 52 of ball 47, to effectively locate the ball and the suspended weight structure for universal pivotal movement about a center 53. At its upper side, ball 47 is truncated to form an upper planar surface 54 which desirably extends directly horizontally in the FIG. 1 full line condition of the apparatus. Surface 54 lies in a plane 55 which intersects and truncates the upper portion of the ball 47, and which therefore is received closer to the center 53 than is the outer spherical surface 52 of the ball. For example, at the point at which surface 54 is nearest to center 53, the distance between surface 54 and the center is the dimension r indicated in FIG. 3. That dimension r is substantially less than the radius of spherical surfaces 52 and 51 with respect to center 53. Other portions of surface 54 are farther than the distance r from center 53, but at all points except the periphery of surface 54 are closer to the center 53 than is surface 52, as previously mentioned.

A preferably cylindrical pin 56 projects upwardly above surface 54, and along the vertical axis 31 of the device, and is guided for only vertical movement by reception within a cylindrical bore in a part 57 screwed into the top wall 50 of the housing. The lower horizontal planar end surface 59 of pin 56 is engageable with top surface 54 of ball 47. The upper end of pin 56 engages a spring arm 60 which is secured to an insulative block 61 and carries a contact assembly 62 engageable with upper and lower contacts 63 and 64 secured to conductive spring arms 65 and 66 mounted by an insulative support block 67 on top of wall 50. The contacts 63 and 64 may be threadedly adjustable relative to mounting arms 65 and 66, to control the points at which contact assembly 62 engages contacts 63 and 64. Electrical connections to the insulated parts 60, 65 and 66 act to make and break connections in accordance with the vertical movement of part 56 by the weight assembly.

The resetting mechanism 14 includes a lever 69 which is pivotally connected at 70 to a mounting bracket 71 secured to housing 15, and which swings upwardly and downwardly about the pivotal axis 70. At a location intermediate its opposite ends, lever 69 contains an elongated slot 72 which receives a pin 73 projecting laterally from stem 30 of the valve, so that downward swinging movement of lever 69 can displace stem 30 and the connected valve downwardly.

The resetting mechanism 14 also includes a funnel-shaped annular deflecting or camming part 74, having a lower cylindrical tubular portion 75 which is a fairly close fit on stem 31 and is therefore guided thereby for only upward and downward movement relative to the stem. The upper flaring portion 76 of the funnel is receivable within the inner cavity 77 in weight 12 when the funnel is in its upper broken line position of FIG. 1. In that position, the tubular portion 75 of the funnel is received about both of the caps 36 and 38 of the two elements 30 and 39.

The funnel is actuated upwardly by a second lever 78, which is pivotally connected at 79 for vertical swinging movement relative to a mounting bracket 80 secured rigidly at its lower end to the first lever 69. The axis of pivotal connection 79 and the axis of the previously mentioned pivotal connection 70 are parallel to one another and horizontal. At its outer end, lever 78 has a portion 81 which forms an actuating handle depressable manually by an operator to cause an inner end 82 of lever 78 to swing upwardly. That inner end of the lever contains an elongated slot 83 within which a pin 84 projecting laterally outwardly from funnel 74 is slidably received, to cause upward actuation of the funnel in response to clockwise pivotal movement of lever 78 as viewed in FIG. 1.

Figure 2:
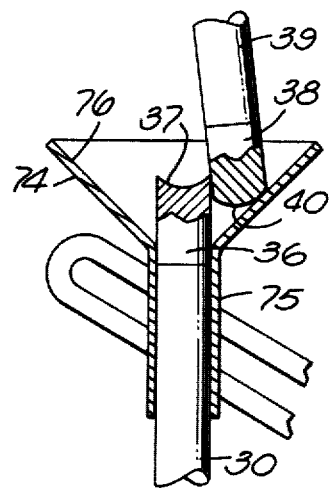
FIG. 2 is a fragmentary vertical section showing certain of the parts after they have been actuated by an earthquake or other shock, and during a resetting operation.

To describe a cycle of operation of the apparatus, assume first of all that the parts are in the full line position of FIG. 1, in which the lower end of element 39 and the upper end of stem 30 are in alignment with one another and retained in such aligned positions by reception of the slightly convex surface 40 in the recess formed by the slightly convex surface 37. The funnel 74 is in this condition in its lower full line position of FIG. 1, in which it cannot interfere with operation of the weight mechanism. If a mechanical shock of predetermined magnitude is encountered, the resultant movement of weight 12, as to the broken line position of FIG. 1, will cause lateral movement of the lower end of part 39 and its carried cap 38 to a position in which part 39 no longer blocks upward movement of stem 30, and consequently spring 28 is free to actuate valve 11 upwardly to a closed position of engagement with seat 27. FIG. 2 illustrates the lower end of weight carrying element 39 in such a laterally deflected position, with the valve stem 30 actuated upwardly to a closed valve condition. Thus, the valve acts to automatically close off flow of a controlled fluid, such as natural gas, in the event of an earthquake or other shock of predetermined magnitude. The upward valve closing movement of stem 30 also acts through pin 73 and slot 72 to swing lever 69 upwardly, and correspondingly shifts pivotal connection 79 and lever 78 upwardly.

Figure 3:
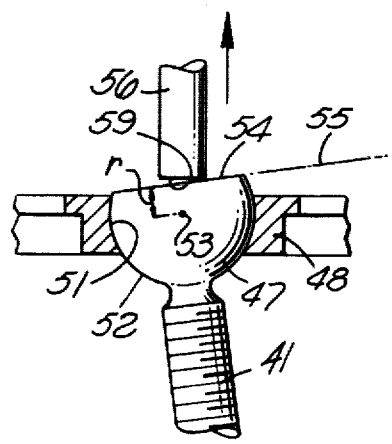
FIG. 3 is a fragmentary vertical section corresponding to a portion of FIG. 1, but showing the universal joint ball in its actuated condition.

The pivotal movement of ball 47 which is caused by such lateral deflection of the lower portion of weight carrying element 39 swings the ball to a position such as that shown in FIG. 3, in which the upper flat surface 54 of the ball acts to displace pin 56 upwardly, to move contact 62 out of engagement with the lower normally closed contact 64 and upwardly into engagement with the top normally open contact 63. Thus, the electrical switch can be utilized to open the circuit to one piece of equipment in response to an earthquake or other shock, and close the circuit to another piece of equipment such as emergency lighting apparatus, at the same time.

Both the valve and the electric switch mechanism will remain in actuated condition until the device is purposely reset. Such resetting is effected by first removing plate 21 at the side of the housing, and then pressing downwardly on handle or pushbutton 81. The initial downward movement of part 81 acts to swing the left end of lever 78 upwardly, with corresponding upward movement of funnel 74 to the position illustrated in FIG. 2, in which the inner frusto-conical camming surface of the funnel engages the lower end of part 39, to thereby halt the upward movement of the funnel. Further downward movement of actuating part 81 causes downward swinging movement of the lower lever 69 toward its full line position of FIG. 1, with consequent downward movement of the valve stem 30 and valve 11 by virtue of the connection at 72-73. When valve stem 30 has reached a position as low as that shown in FIG. 1, the lower end of part 39 is free for inward swinging movement into alignment with valve stem 30, with the result that funnel 74 moves upwardly and by that movement cams or deflects part 39 laterally inwardly into that aligned position with respect to stem 30. Ultimately, the lever 78 and funnel reach their broken line positions of FIG. 1, in which the lower tubular portion 75 of funnel 74 is received about and very positively aligns elements 39 and 30 to thus reset them to their initial condition. The operator releases the actuating element 81, permitting the funnel and lever 78 to fall downwardly by their own weight to the full line positions of FIG. 1, following which plate 21 is replaced on the side of the housing and the device is then ready for further functioning as a shock responsive safety unit.

While a certain specific embodiment of the present invention has been disclosed as typical, the invention is of course not limited to this particular form, but rather is applicable broadly to all such variations as fall within the scope of the appended claims.

We claim:

1. A shock responsive device comprising:
   a first element yieldingly urged upwardly;
   a weight structure above said first element displaceable by shock forces;
   a universal connection above said first element suspending said weight structure in depending relation for universal pivotal movement between a normal position in which a lower portion of the weight structure blocks upward movement of said first element and laterally deflected positions releasing the first element for upward movement;
   said universal connection including a ball connected to the weight structure, and a socket structure disposed about the ball and supporting it for universal movement;
   an additional element projecting upwardly above said ball and movable upwardly and downwardly relative thereto;
   switch means actuable by said additional element; and
   means forming a surface on said ball engageable with said element to deflect it upwardly in response to universal pivotal movement of the weight structure from said normal position.

2. A shock responsive device comprising:
   a first element yieldingly urged in a first direction;
   a second element engageable with said first element in a relation blocking movement thereof in said first direction;
   weight means responsive to mechanical shock forces to shift one of said elements relative to the other generally transversely of said first direction and between an active position in which said second element blocks movement of the first element in said first direction and an inactive position permitting such movement; and
   resetting mechanism operable to return said first element in a direction generally the opposite of said first direction, and including deflecting means for shifting said one element generally transversely from said inactive position to said active position to again block movement of the first element in said first direction;
   said resetting mechanism including a first lever mounted for swinging movement and connected to said first element to actuate it in said opposite direction, and a second lever pivotally connected to said first lever and operable upon pivotal movement relative thereto to move said deflecting means in a direction to deflect said one element between inactive and active positions.

3. A shock responsive device as recited in claim 2, including manually actuable means at an end of said second lever adapted to be manually moved in a direction simultaneously exerting force through said second lever for displacing said deflecting means and exerting force against said first lever to move said first element.

4. A shock responsive device comprising:
   a first element yieldingly urged in a first direction;
   a second element engageable with said first element in a relation blocking movement thereof in said first direction;
   weight means responsive to mechanical shock forces to shift one of said elements relative to the other generally transversely of said first direction and between an active position in which said second element blocks movement of the first element in said first direction and an inactive position permitting such movement; and
   resetting mechanism operable to return said first element in a direction generally the opposite of said first direction, and including deflecting means for shifting said one element generally transversely from said inactive position to said active position to again block movement of the first element in said first direction;
   said deflecting means including a generally funnel-shaped deflecting part disposed about said second element and movable axially relative thereto and engageable with said other element to deflect it between inactive and active positions;
   said resetting mechanism including a first lever mounted for swinging movement and connected to said second element to actuate it in said opposite direction in response to such swinging movement, a second lever pivotally connected to said first lever and connected at an offset location to said funnel-shaped deflecting part in a manner actuating it axially relative to said second element, and manually operable means at an opposite end of said second lever operable when moved to actuate said second element through said first lever in said opposite direction, and to actuate said funnel-shaped deflecting part through said second lever in a direction to deflect said one element from inactive to active position.

5. A shock responsive device comprising:
   a first element mounted for generally vertical movement between a lower position and an upper position;
   spring means yieldingly urging said first element upwardly to said upper position;
   a shock responsive weight structure;
   a universal connection at a location spaced above said first element supporting said weight structure for essentially universal pivotal movement and suspending said weight structure in depending relation with respect to said universal connection so that the weight structure can hang downwardly by gravity in a predetermined normal position;
   said weight structure having a lower portion beneath said universal connection which in said normal position is engageable with an upper portion of said first element in a relation blocking upward movement thereof from said lower position to said upper position when the weight structure is in its normal position, and displaceable laterally to an inactive position out of the path of upward movement of said portion of said first element to release the first element for upward movement upon universal pivotal movement of said weight structure induced by shock; and resetting mechanism operable to return said first element downwardly to said lower position, and including means for deflecting said lower portion of the weight structure laterally from said inactive position to said normal position to again block upward movement of said first element;

said deflecting means including a camming part movable upwardly relative to said first element and having a camming surface engageable with said lower portion of the weight structure to deflect it laterally to normal position.

6. A shock responsive device comprising:

a first element mounted for generally vertical movement between a lower position and an upper position;

spring means yieldingly urging said first element upwardly to said upper position a shock responsive weight structure;

a universal connection at a location spaced above said first element supporting said weight structure for essentially universal pivotal movement and suspending said weight structure in depending relation with respect to said universal connection so that the weight structure can hang downwardly by gravity in a predetermined normal position;

said weight structure having a lower portion beneath said universal connection which in said normal position is engageable with an upper portion of said first element in a relation blocking upward movement thereof from said lower position to said upper position when the weight structure is in its normal position, and displaceable laterally to an inactive position out of the path of upward movement of said portion of said first element to release the first element for upward movement upon universal pivotal movement of said weight structure induced by shock; and resetting mechanism operable to return said first element downwardly to said lower position, and including means for deflecting said lower portion of the weight structure laterally from said inactive position to said normal position to again block upward movement of said first element;

said deflecting means including a generally funnel-shaped deflecting part disposed about said first element and movable upwardly and downwardly relative thereto and having a flaring camming surface engageable with said lower portion of the weight structure to deflect it laterally to said normal position.

7. A shock responsive device as recited in claim 6, in which said resetting mechanism includes a lever mounted for swinging movement and connected to said funnel-shaped part to move it upwardly in response to such swinging movement.

8. A shock responsive device comprising;

a first element mounted for generally vertical movement between a lower position and an upper position;

spring means yieldingly urging said first element upwardly to said upper position;

a shock responsive weight structure;

a universal connection at a location spaced above said first element supporting said weight structure for essentially universal pivotal movement and suspending said weight structure in depending relation with respect to said universal connection so that the weight structure can hang downwardly by gravity in a predetermined normal position;

said weight structure having a lower portion beneath said universal connection which in said normal position is engageable with an upper portion of said first element in a relation blocking upward movement thereof from said lower position to said upper position when the weight structure is in its normal position, and displaceable laterally to an inactive position out of the path of upward movement of said portion of said first element to release the first element for upward movement upon universal pivotal movement of said weight structure induced by shock; and resetting mechanism operable to return said first element downwardly to said lower position, and including means for deflecting said lower portion of the weight structure laterally from said inactive position to said normal position to again block upward movement of said first element;

said resetting mechanism including a lever mounted for upward and downward swinging movement and connected to said first element to move it downwardly in response to downward swinging movement of the lever.

9. A shock responsive device comprising:

a first element mounted for generally vertical movement between a lower position and an upper position;

spring means yieldingly urging said first element upwardly to said upper position;

a shock responsive weight structure;

a universal connection at a location spaced above said first element supporting said weight structure for essentially universal pivotal movement and suspending said weight structure in depending relation with respect to said universal connection so that the weight structure can hang downwardly by gravity in a predetermined normal position;

said weight structure having a lower portion beneath said universal connection which in said normal position is engageable with an upper portion of said first element in a relation blocking upward movement thereof from said lower position to said upper position when the weight structure is in its normal position, and displaceable laterally to an inactive position out the path of upward movement of said portion of said first element to release the first element for upward movement upon universal pivotal movement of said weight structure induced by shock; and resetting mechanism operable to return said first element downwardly to said lower position, and including means for deflecting said lower portion of the weight structure laterally from said inactive position to said normal position to again block upward movement of said first element;

said deflecting means including a camming part operable upon upward movement to deflect said lower portion of the weight structure laterally between inactive and normal positions;

said resetting mechanism including a first lever mounted for upward and downward swinging movement and connected to said first element to move it downwardly upon such swinging movement, and a second lever pivotally connected to said first lever and connected to said deflecting part in a relation to shift it upwardly relative to said elements.

10. A shock responsive device comprising:

a first element mounted for generally vertical movement between a lower position and an upper position;

spring means yieldingly urging said first element upwardly to said upper position;

a shock responsive weight structure;

a universal connection at a location spaced above said first element supporting said weight structure for essentially universal pivotal movement and suspending said weight structure in depending relation with respect to said universal connection so that the weight structure can hang downwardly by gravity in a predetermined normal position;

said weight structure having a lower portion beneath said universal connection which in said normal position is engageable with an upper portion of said first element in a relation blocking upward movement thereof from said lower position to said upper position when the weight structure is in its normal position, and displaceable laterally to an inactive position out of the path of upward movement of said portion of said first element to release the first element for upward movement upon universal pivotal movement of said weight structure induced by shock; and resetting mechanism operable to return said first element downwardly to said lower position, and including means for deflecting said lower portion of the weight structure laterally from said inactive position to said normal position to again block upward movement of said first element;

said deflecting means including a generally funnel-shaped part disposed about said first element and movable vertically relative thereto and having an upper flaring camming surface engageable with said lower portion of the weight structure to deflect it to normal position in response to upward movement of the funnel-shaped camming part;

said resetting mechanism including a first lever mounted for upward and downward swinging movement and connected to said first element to actuate it downwardly in response to downward swinging movement, a second lever pivotally connected to said first lever and having a first end connected to said funnel-shaped part to actute it upwardly upon swinging movement of the second lever, and means at a second end of the second lever manually actuable to simultaneously exert force against both levers acting through the first lever to move said first element downwardly and acting through said second lever to move said funnel-shaped part upwardly.

11. A shock responsive device comprising:

a weight structure displaceable by shock forces;

a universal connection suspending said weight structure in depending relation for shock-induced universal pivotal movement about a predetermined center between a normal position and laterally displaced actuated positions;

said universal connection including a ball connected to the weight structure and having an externally spherically curving surface, and socket means having a correspondingly spherically curved surface engageable with the ball to mount it for universal pivotal movement;

said ball having an upper essentially flat surface lying essentially in a plane which intersects and truncates the sphere defined by said spherically curving surfaces of the ball and socket means and which is closer to said center of the sphere defined by said spherically curving surfaces than are said surfaces;

an element mounted for movement along an axis extending essentially through said center and having an end engaging said essentially flat surface in a relation displacing said element axially in response to pivotal movement of the ball by the weight structure;

a housing structure having a top wall;

said socket means being mounted to the underside of said top wall, and supporting said ball at the underside of said wall;

said top wall having a recess extending upwardly thereinto above said ball and containing an opening through which said element extends vertically upwardly to the top of said wall;

switch means mounted to the upper side of said top wall and actuable by upward axial movement of said element; and a valve element spring urged upwardly beneath said weight structure and releasably retained in a lower position by the weight structure when it is in said normal position, and adapted to release the valve for upward closing movement upon lateral deflection of the weight structure.

* * * * *